United States Patent [19]
Sillanpää et al.

[11] Patent Number: 6,138,031
[45] Date of Patent: Oct. 24, 2000

[54] CALL ESTABLISHMENT IN A MOBILE COMMUNICATION SYSTEM

[75] Inventors: Anna Sillanpää, Helsinki; Hannu Töyrylä, Vantaa; Tapio Paavonen, Saarijärvi, all of Finland

[73] Assignee: Nokia Telecommunications Oy, Espoo, Finland

[21] Appl. No.: 08/983,012

[22] PCT Filed: Jun. 19, 1996

[86] PCT No.: PCT/FI96/00357

§ 371 Date: Dec. 22, 1997

§ 102(e) Date: Dec. 22, 1997

[87] PCT Pub. No.: WO97/01255

PCT Pub. Date: Jan. 9, 1997

[30] Foreign Application Priority Data

Jun. 21, 1995 [FI] Finland ..................................... 953108

[51] Int. Cl.[7] ..................................................... H04B 7/00
[52] U.S. Cl. .......................... 455/512; 455/514; 455/527
[58] Field of Search ..................................... 455/512, 518, 455/519, 521, 404, 509, 514, 527, 516, FOR 114, FOR 115, FOR 119

[56] References Cited

U.S. PATENT DOCUMENTS

| | | |
|---|---|---|
| 4,716,407 | 12/1987 | Borras et al. . |
| 5,257,416 | 10/1993 | Cannon . |
| 5,638,055 | 6/1997 | McDonald et al. ...................... 455/512 |
| 5,742,904 | 4/1998 | Pinder et al. ........................... 455/521 |

FOREIGN PATENT DOCUMENTS 9202863  4/1994  Sweden .

*Primary Examiner*—Thanh Cong Le
*Attorney, Agent, or Firm*—Pillsbury Madison & Sutro

[57] ABSTRACT

A call establishment in a mobile communication system comprising mobile stations that contain database in which are marked first calls of a first priority level, and a network infrastructure which the mobile stations communicate with. The process includes the steps of defining in tie database of the mobile station one or more force-controlled calls provided with a second priority level being higher than first priority level and directing the mobile station to one or more forced-controlled calls of the second priority according to the priority of the second call.

7 Claims, 3 Drawing Sheets

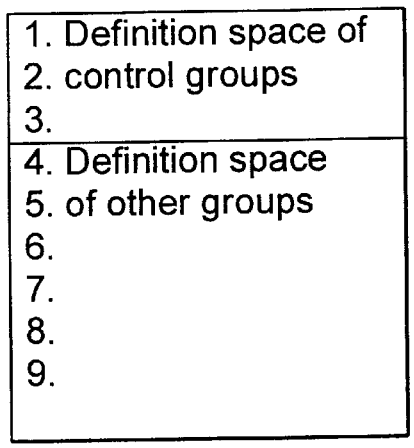
FIG. 1
MS                    EX
— · MODIFY_GROUP — ▶
FIG. 2
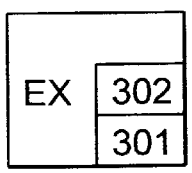
                    MS           MS
— · MODIFY_GROUP — ▶
— — — — MODIFY_GROUP — — ▶
FIG. 3
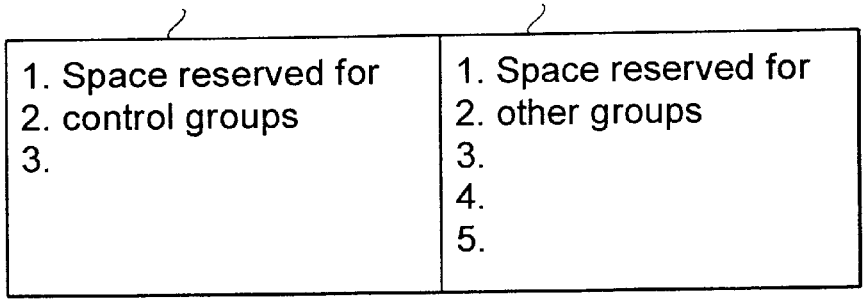
FIG. 5

MS                                     EX

— — PRIORITY_GROUP_USAGE — — →

EX                          MS              MS

— — PRIORITY_GROUP_USAGE — — →

— — PRIORITY_GROUP_USAGE — — — — — →

CALL ESTABLISHMENT IN A MOBILE COMMUNICATION SYSTEM

FIELD OF THE INVENTION

The present invention relates to a method for call establishment in a mobile communication system comprising mobile stations that contain a database in which are marked first calls of a first priority level, and a network infrastructure which said mobile stations communicate with.

The invention relates to all telecommunication systems that have communications competing with one another. The invention is particularly necessary in systems where there are subscribers who can take part in simultaneous communications competing with one another. The invention particularly relates to mobile communication systems, such as PMR mobile communication systems (PMR Private Mobile Radio), that are used by organizations and the authorities. In these kind of networks, need often arises for establishing normal or group calls which have a priority with regard to one another, and which can be participated by several subscribers at the same time.

BACKGROUND OF THE INVENTION

On the basis of the above, it can be noted that telecommunication systems may have situations in which there are several parallel or competing communications to one subscriber. These communications can be, for example, group calls. The situation may be such that the subscriber is connected to a so-called basic communication group, which is organization-specific and by means of which information on the daily routines is conveyed within the network. During special incidents, such as emergencies, it may be necessary to create inter-organization communication groups to which some of the subscribers of the different organizations must immediately be connected. In such a case, it is necessary to create communication groups into which subscribers can be forced in order to make them participate even if they were currently taking part in some other communication, for example a previous group call. It may also be necessary to make subscribers stay in a communication created for a special incident even if another communication, such as a new call or group call, were to begin in the middle of the communication in question.

Need to direct subscribers into a priority communication arises especially in case a large part of the communication within the system is group communication, as is the case in the PMR systems mentioned above, and the subscriber may participate in several group communications, or if the subscriber receives several individual communications, or if individual communications are competing with one or several group communications. In such a system there might be need to provide one or more of the communications with a special status so that primarily traffic of the communications that have the special status is forwarded by the subscriber station to the user. Giving the special status is carried out by providing the calls with different priority levels.

In a prior art solution, disclosed in the U.S. Pat. No. 5,257,416, each communication is allocated a dedicated channel which a mobile station checks in order to find out whether there is communication traffic for the station on that channel. This means that the subscriber station scans different radio channels and if there is traffic on several channels the station checks that it is on the correct channel in accordance with the priority hierarchy.

Giving priority to the communications received by a subscriber or subscribers represents the prior art solution to the problem. The prior art solution, however, is not applicable to a situation in which priority tables stored for example in the subscriber stations of the subscriber are continuously changed. The previous solution causes problems because all the communication identifications are within the same area, which means that when adding identifications it is difficult to keep the priority tables in the desired order. As new numbers are added, two kinds of priority table assignments can be employed:

In an absolute priority table assignment, an absolute position is given, for example the 1st, 3rd or 5th. A problem with this is that in order for the assignment to be clear, the position must be unoccupied and it must be known accurately. In addition, to keep the implementation simple, the position should be the same for all the subscribers for whom the new identification is set. Such requirements are very restrictive if identifications are to be added and deleted often, and particularly if common communication identifications between organizations are to be employed.

In a relative priority table assignment, a relative position is given, for example the highest, lowest or in the middle. Such assignments are very imprecise particularly in situations in which the settings are frequently changed, resulting in that the outcome often differs from the desired one. Particularly the communication identifications in the middle are difficult to organize in a precise order.

Thus, it has become evident that when following the prior art solutions it is difficult to implement a method and an arrangement wherein subscribers could be directed to a desired communication when they are already engaged in a communication. It is especially difficult to divert subscribers to a new communication and yet provide them with an opportunity to flexibly return to the previous communication.

It must in addition be noted that to set a subscriber in a force-controlled mode and to reinstate the preceding mode, as in the prior art solutions, takes up a lot of capacity as this has required storing the previous data, forwarding the new data and re-transmitting the previous data in case the data has been stored at the exchange and updated via it.

It must furthermore be noted that a drawback of the prior art solutions is that the former systems do not support continuous dynamic change of a subscriber's communication mode in a situation where the subscriber is shifting between a selected and a fully controlled communication mode.

In prior art solutions, a drawback is that subscribers cannot be forced in a communication without having to interfere with that communication which the subscriber abandons, which results in that the previous communication has been entirely or partly released. This creates a serious problem, because a group call in particular cannot always be released without removing also such subscribers off the communication that were intended to be kept in the existing communication. It must furthermore be noted that a temporary release of a group call may lead into the resources allocated to that call being handed over to another call after the release. Naturally, that is undesirable and unnecessarily hinders communication.

BRIEF DESCRIPTION OF THE INVENTION

It is an object of the present invention to obtain a method and an arrangement by which the prior art problems and drawbacks can be eliminated.

The object of the invention is to obtain a method and a system by means of which mobile stations can be requested to a high priority call, such as a group call or an individual call, so that the mobile station definitely switches to the desired call, and that the calls and call definitions previously assigned to said mobile station and possibly also the database of the mobile communication system remain unchanged so that after the high priority call the mobile station can be directed quickly and flexibly to such a call in which it should take part on the basis of the previous call definition.

This new type of method for call establishment in a mobile communication system is achieved with the method according to the invention, which is characterized by comprising the steps of defining in the database of the mobile station one or more force-controlled calls provided with a second priority level and identification, said second priority level being higher than the first priority level, and directing the mobile station to one of the force-controlled calls of the second priority according to the priority of the second call.

The invention further relates to a mobile station which comprises: a transceiver unit, a control unit, a database and a user interface.

The mobile station of the invention is characterized by further comprising a storing means which is responsive to a received call-defining message and by means of which one or more force-controlled calls provided with a second priority level and identification, said second priority level being higher than the first priority level, are defined in the database of the mobile station.

The invention further relates to a mobile communication system comprising mobile stations that contain a database in which first calls of the first priority level are marked with an identifier, and a network infrastructure which said mobile stations communicate with.

The mobile communication system of the invention is characterized by comprising a call-defining means for producing call-defining messages and for transmitting them to desired mobile stations, and in response to the call-defining messages one or more force-controlled calls having an identification and being on a second priority level higher than the first priority level are defined in the database of the mobile station.

The invention is based on determining another group of priority communications (e.g. force-controlled communications) in the databases of the mobile stations in addition to priority communications (e.g. group calls) defined previously therein. When such a force-controlled communication is to be established, desired subscribers will be directed thereto by transmitting, on a control channel, a command to the mobile stations to switch to the force-controlled channel. This means that the desired subscribers are diverted to the force-controlled call for as long as they are requested to participate in the call in question. Several such communication definitions having a special status may exist, and they may have a priority hierarchy in a similar manner as, for example, conventional group calls. Thus, mobile stations are directed by control commands to desired high priority calls, in which the mobile stations participate according to the priority levels of the calls.

An advantage of the method according to the invention is that it makes it more certain to have a subscriber take part in a specific communication or communications when these communications are considered to be of an especially significant nature. The characteristics of the subscriber station have an influence on whether the subscriber station is set to a special mode so that it is temporarily or finally activated only to specific priority communications, or so that it is primarily activated to high priority communications but may also participate in communications of a lower priority level. In the latter case, possible previous priority instructions will not be entirely overlooked.

A further advantage of the invention is that the method and arrangement according to it can be employed for immediately diverting subscribers to a communication being defined and established for example in situations in which the call participants cannot be anticipated with such accuracy that they could be pre-programmed by taking into consideration any subscriber-specific communication priorities of the subscribers, etc.

BRIEF DESCRIPTION OF THE DRAWINGS

In the following, the invention will be described in greater detail with reference to the attached drawings, in which FIG. 1 shows a mode chart of a situation in which a mobile station has normal communication modes and force-controlled communication modes, FIG. 2 shows a message chart of a situation in which control information is forwarded from the mobile station defining the force-controlled call to the exchange of the mobile communication system, FIG. 3 shows a message chart of a situation in which control data is forwarded from the exchange of the mobile communication system to those mobile stations that are to take part in the force-controlled communication when required, FIG. 5 shows a block diagram of a memory unit in the subscriber station.

DETAILED DESCRIPTION OF THE INVENTION

Figure 4:
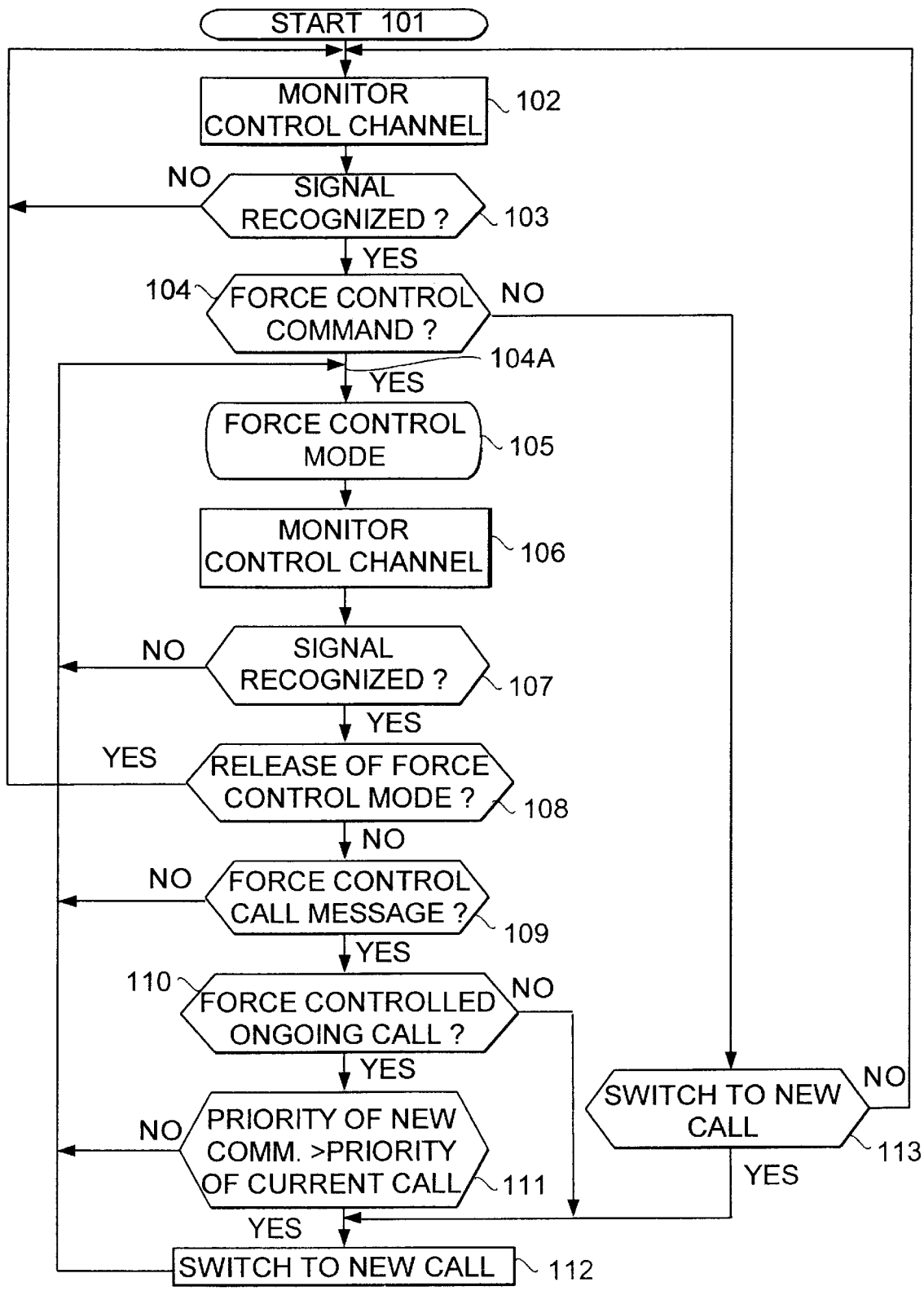
FIG. 4 shows a flow chart of the operation of the mobile station when force control is set and when the mobile station is in the force-controlled mode.

Establishing a force-controlled communication, i.e. requesting desired subscribers in a force-controlled communication to be established, may take place through the radio path or by some other means e.g. from the system. This means that the subscriber is, in a way, forced into or directed to a specific communication or communications. The directing may take place so that a subscriber notifies a specific subscriber station through the system that the "priority" subscriber has moved to a control mode. The control mode may last until it is released either e.g. from the system or by the holder of the subscriber station. The control mode may be taken in use on a temporary basis and it may terminate after a discontinuation carried out from a subscriber station (or the like) of groups of a special status, after power switch-off of a subscriber station, or after the end of a specific call. Switching to a control mode may take place separately or, for example, in connection with determining the identity of the group.

When a subscriber station is in a control or forced mode, it can only take part in communications having special status, or it is to switch to the communications of special status, possibly in the middle of other communications in case these communications of special status are established in such a manner that subscribers may have other ongoing communications. After such a call of special status terminates, the subscriber can return to the interrupted communication, or some other communication which is going on or is to be set up and which is not a force-controlled communication. It is possible to define several communications of special status, also for a specific subscriber. In such a case, the communications can be organized into a hierarchy, whereby a switch possibly takes place to one communication even during other (lower priority) communications, or the priority hierarchy may only concern new communications in which case a switch from an ongoing call is not made to the new communication. The forcing may be such that the subscriber station verifies it for example according to settings created therein, or the user of the subscriber station may verify it either as the setting is being made or when switching to such a communication, for example in the middle of another communication. The verifying may be active acceptance or rejection, or passive acceptance of the default value. The default value may be an accepting or rejecting one, and other conditions may be related thereto, for example concerning the communication quality, the mode of the subscriber station or other parameters.

In the following, an example will be described on how an authorized user MS, e.g. a dispatcher, wants to set up a priority group communication, and notifies the system of it, for example the system exchange EX or a database. The information can be conveyed by several various methods, for example in connection with the actual group communication definition (method 1) or separately in advance (method 2). In both methods, the groups the subscriber stations monitor have been demarcated to different storage areas, whereby it is possible to set, for example, communications that are temporarily important in the area of the force-controlled groups and to activate them on a temporary basis. Upon expiration of such a temporary demand, the previous mode can be restored by deleting the temporary data of the force-controlled groups.

FIG. 1 describes method 1 in greater detail: the control data is forwarded in connection with the actual group communication definition, or associated thereto.

In a subscriber station, for example in the subscriber's smart card or other memory, a part of the space allocated to the group definitions may be intended for groups in a control mode. If such have been defined, they are of higher priority than possible other defined groups. For example, a group definition space of the subscriber station may be divided so that if there are no defined force-controlled groups, the other groups will operate as normal, and on the other hand so that if there are defined force-controlled groups it nay denote that the other groups are ignored for the time being, or that the communications of the other groups will be entered into only when there are no other active control groups.

FIG. 2 illustrates setting of a control mode in a system in connection with group defining, according to method 2 described. The mobile station MS transmits, to the exchange EX, a group-defining message Modify group by means of which an authorized mobile station MS, for example the dispatcher, defines into the mobile communication system, for example in the exchange or database, the desired force-controlled call and the subscribers taking part therein. This data is supplemented with priority which indicates that a force-controlled call is to be established as well as the priority of the call. The priority may for example indicate that previous definitions are to be cancelled for the time being and the group specified herein will be monitored primarily.

FIG. 3 illustrates a message chart of a situation in which control data is transmitted from the exchange EX of the mobile communication system to those mobile stations MS that are to participate, if desired, in the force-controlled communication. The system (i.e. its exchange EX) forwards the information to all the subscribers MS that are to take part in the force-controlled communication. The information on the force-controlled communication temporarily deletes the activation information of a communication defined previously. This is to say that the previous or other table is ignored if a group call or calls have been defined in the force-controlled mode. This means that the previous information again comes, or can come, into force when the definition of the priority communication, i.e. the communication defined in the force-controlled space, is released. The control mode can be released via the radio path by destroying the group definition or by changing it so that it no longer contains the control definition.

FIG. 3 also shows a mobile communication system comprising mobile stations MS, 500 (FIG. 8) that contain a database 509 (FIG. 8) in which first calls of the first priority level are defined, and a network infrastructure EX which said mobile stations MS communicate with. The mobile communication system in question comprises a call-defining means for producing call-defining messages and for transmitting them to desired mobile stations, and in response to the call-defining messages one or more force-controlled calls having an identification and being on a second priority level higher than the first priority level are defined in the database of the mobile station.

The mobile communication system EX according to the invention comprises a force control means 302 for transmitting force control messages to the mobile stations MS, 500, and in response to said force control messages the mobile stations are directed to the call on the second priority level higher than the first priority level.

FIG. 4 illustrates a flow chart of how the mobile station operates in the force-controlled mode. In the operation disclosed herein the control messages are transmitted from the system to the mobile station on one of the control channels of the system. The operation according to the invention may also be carried out by transmitting the control messages on a traffic channel. Setting the force-controlled mode, use and release thereof take place as indicated in FIG. 4: from the initial mode 101, the subscriber station moves to monitor a control channel 102. It analyses the messages transmitted on the control channel, and picks for further processing those messages that are directly addressed to the user of the subscriber station or other subscriber equipment with his dedicated identifier or a group identifier associated with him. Next, the subscriber station examines 103 whether the signal in question is addressed to it. When the subscriber station detects that the signal on the control channel is addressed to it, it investigates 104 whether the message received is a force-controlled mode message. If it is 104A, the subscriber station goes to force-controlled mode 105. If it is not, the message is processed in the normal manner 113 so that the mobile station analyses 113 whether it is to switch to a new call. If the mobile station is to switch to a new call, the process continues at step 112 where the mobile station switches to the new call. If, on the other hand, the mobile station does not switch to the new call, the process begins from the beginning with the mobile station again commencing to monitor the control channel 102. If the subscriber station has at step 105 gone to a force-controlled mode, it continues to monitor 106 the control channel. When the mobile station detects a message 107 on the control channel, it checks whether it is a definition 108 cancelling the force-controlled mode. The force-controlled mode can be released by deactivating it or by releasing the call definitions that are associated with the force-controlled mode. If the message is not such that cancels the force-controlled mode, it will be checked whether it is a call set-up message 109 that is associated with an identifier provided with force control. For example, a group identifier may be provided with force control that is pre-programmed at step 104. If the subscriber station does not take part in a call at the moment in question, it will directly join the new call at step 112. If the force-controlled mode already has an active call, i.e. the subscriber is participating in a force-controlled call, it is examined at step 111 whether the new call message is related to such a force control defined message that has a higher priority than the priority 110 of the ongoing call. If that is the case, the subscriber station switches to this call 111. If the call has a lower priority, the subscriber station stays in the existing force-controlled call.

FIG. 5 is a block diagram illustration of a memory unit in a subscriber station. The figure is related to an embodiment implementing the method of the invention, wherein the control data is separately transmitted in advance, and the group-defining data is transmitted after that. In accordance with FIG. 5, two separate storage spaces may be allocated to the group definitions in the subscriber station, or for example the subscriber's smart card. Of these two spaces, the first, 598, is used for the force-controlled groups, and the other, 599, for other group definitions. If the force-controlled mode has been activated, the group definitions to he made, which may in addition contain a control mode data, are carried out to the separate force-controlled space and otherwise to the space allocated to other groups. The means that from the available memory located at the terminal equipment the storage space 598 is allocated to the control groups and the storage space 599 to the other groups.

If no force-controlled group have been defined, the other groups operate normally. If force-controlled groups have been defined, it can mean that the other groups are temporarily ignored or that the communications of the other groups are only entered into when there are no other active force-controlled groups.

Figures 6, 7, 8:
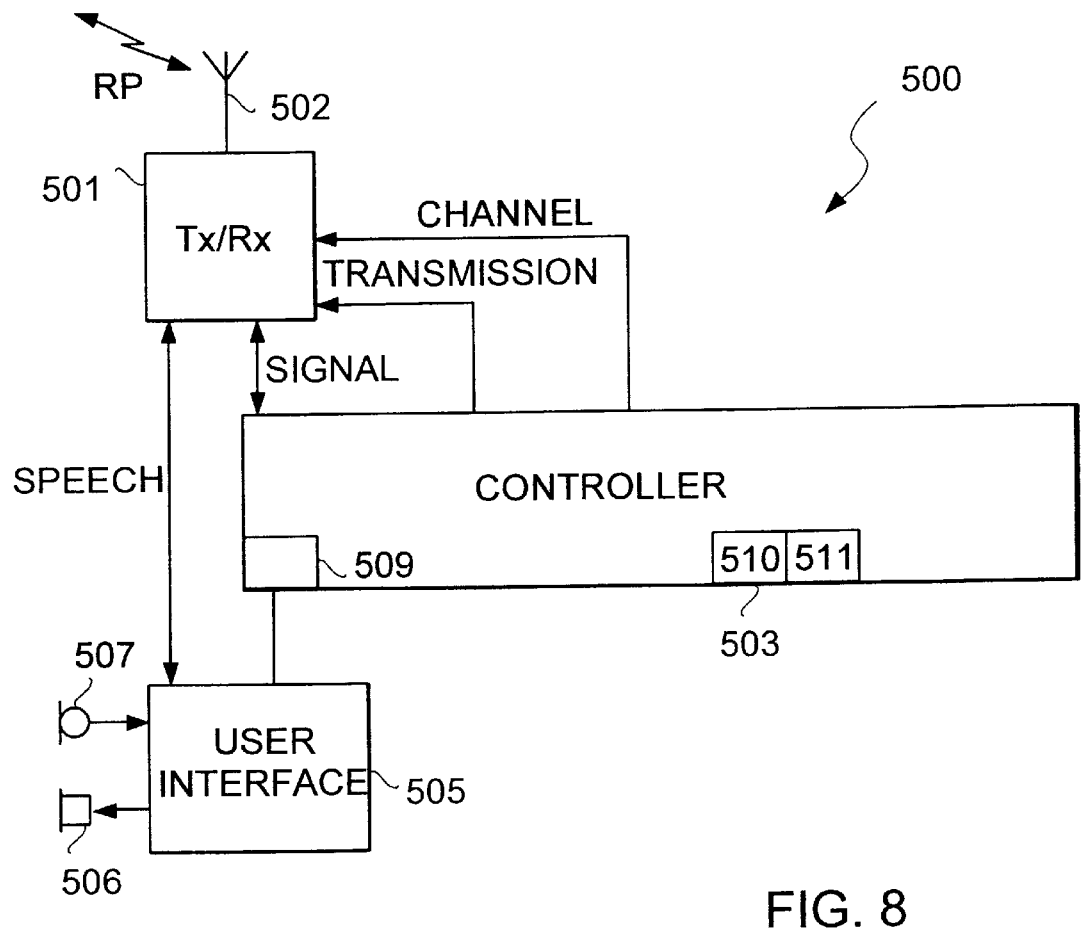
FIG. 6 shows a message chart of activating a force-controlled communication.
FIG. 7 shows a message chart of a situation in which the exchange of the mobile communication system forwards a force control message.
FIG. 8 is a block diagram illustration of a radio unit according to the invention.

FIG. 6 is a message chart in which a subscriber MS of a mobile communication system, for example a priority subscriber or a dispatcher, commands the mobile communication system, for example its exchange EX, to activate a force-controlled communication. This takes place by transmitting a Priority_group_usage message by means of which the commanding party, i.e. the subscriber who is doing the activating, defines the target group which may consist of one or more subscribers or subscriber groups. Naturally, it is possible to activate the operation also by transmitting other kinds of messages or by some other means. Furthermore the activating subscriber may give within the command other defining parameters, which may for example enlarge or reduce the target group given. In response to the command, the system forwards the information to all the subscribers required. This information temporarily cancels the activation information of a previously defined communication, and the groups given after the definition are those in whose communication the subscribers take part until the definition is released and/or the groups in question are broken up. Thus, the previous, or some other, table is ignored if a group or groups have been defined in the control space. Later, it is possible to remove the groups defined in the control space, whereby the previous table can be reinstated. The subscriber may possibly accept or reject the force control separately. In addition, the force control may be responded to for example always or when the force control is accepted or rejected, or by means of some other regulations. The previous information is reinstated upon releasing the definition of the force-controlled priority communication.

FIG. 7 illustrates a message chart of a situation in which the exchange of the mobile communication system forwards the force control message of FIG. 6, i.e. the Priority_group_usage message. By this message, the mobile communication system, particularly its exchange EX, forwards the information of FIG. 6 to the mobile stations MS that are to take part in the communication. The mobile stations receiving the message store the information of said message in their respective memories, and, when required, participate in the force-controlled communication. The force control definition carried out in FIG. 7 can be cancelled from the subscribers by transmitting a command that deletes the control mode: this command deletes the group definition(s) containing the force control definition.

It must furthermore be noted that the definitions for force-controlled communications can be set and deleted by means of the radio path, keyboard or communication link either in the subscriber station or e.g. the smart card of the subscriber, or a similar device from which the feature can be activated whenever necessary.

FIG. 8 is a block diagram illustration of a radio unit according to the invention. The figure shows a typical radio unit 500 communicating on a direct mode channel, such as a subscriber-operated mobile phone, a mobile station or a subscriber station. The function of the transceiver unit (TX/RX) 501 is to match onto the radio channel employed on any one occasion. An antenna 502 is connected to the transceiver 501, the antenna having connection to the radio path RP. Usually, radio frequencies between the range 60–1000 MHz (VHF and UHF bands) are used, although other frequencies can also be used. An analog modulation may be applied on the radio path RP, whereby the modulation method is usually phase modulation. Other kinds of modulation methods may be applied as well. For signalling purposes, fast frequency shift keying modulation (FFSK), for example, may be used. Transmission on the radio path may also be digital.

The user interface 505 comprises an electroacoustic transducing means, typically a loudspeaker 506 and a microphone 507, and possibly buttons relating to beginning, ending and dialling a call. Because in a trunked system conversation advantageously takes place in turns, the subscriber unit typically contains a push to talk button (PTT) which must be kept pressed down for the duration of the speaking turn. The push to talk button is not shown in FIG. 8.

The purpose of a controller 503 is to control the operation of the radio unit. The controller is connected to the user interface 505, from which it obtains impulses relating to, for example, the call initiation and termination. Through the user interface 505, the controller 503 may also provide the user with voice/sound or visual symbols relating to the operation of the mobile phone or the mobile radio system.

The controller 503 is connected to the transceiver TX/RX 501. The channel employed by the transceiver is determined by the controller 503, meaning that the transceiver tunes onto a channel, i.e. radio frequency and an appropriate time slot, determined by the controller 503. The radio unit according to the invention is able to tune onto a direct mode channel. The transceiver 501 is also switched on controlled by the controller 503. The controller 503 receives and transmits signalling messages by means of the transceiver 501. A radio unit 500 according to the invention, may be used, for example, in a mobile communication system, i.e. a radio system, comprising a radio network which has at least one base station and subscriber stations, and possibly one or more repeater stations forwarding traffic between at least one base station and subscriber stations communicating on a direct mode channel. Said radio unit contains a transceiver unit 501 for receiving transmissions transmitted by other radio units, and for transmitting the transmissions to said other radio units, a control unit 503 for controlling the radio unit functions, and a user interface 504.

The radio unit 500 according to the invention further comprises a database 509. The mobile station MS, 500 of the invention is characterized by comprising a storing means 510 responsive to the received call-defining messages. By means of the storing means, one or more force-controlled calls having a second priority and identification, said second priority level being higher than the first priority level, are defined in the database of the mobile station.

The inventive mobile station further comprises a channel directing means 511 responsive to the received force control messages for directing the mobile station to the call provided with the second priority level higher than the first priority level.

In an alternative embodiment of the invention, the subscriber may choose definition-specifically, number-specifically or communication-specifically not to switch or accept to move to a force-controlled call. This possibility can be determined in the subscriber station, or the subscriber may make the decision on a case by case basis.

The drawings and the description related thereto are only intended for illustrating the idea of the invention. The method for call establishment may vary in details within the scope of the claims. Although the invention is in the above described in connection with PMR mobile communication systems, it can be applied to other kinds of mobile communication systems as well.

We claim:

1. A method for call establishment in a mobile communication system the method comprising the steps of
   providing the system with mobile stations that contain a database in which are marked first calls of a first priority level,
   providing the system with a network infrastructure which said mobile stations communicate with,
   defining in the database of the mobile station one or more force-controlled calls provided with a second priority level and identification, said second priority level being higher than the first priority level, and
   directing the mobile station to one of the force-controlled calls of the second priority according to the priority of the second call.

2. A method as claimed in claim 1, wherein said defining being carried out by transmitting a call-defining message from the network infrastructure to the desired mobile stations, the message defining the force-controlled call in the database of the mobile station.

3. A method as claimed in claim 1, wherein said directing the mobile station to a force-controlled call being carried out by transmitting a force control message from the network infrastructure to the desired mobile stations, the message directing the mobile station to the desired force-controlled call.

4. A mobile station comprising:
   a transceiver unit,
   a control unit,
   a database, in which are marked first calls of a first priority level,
   a user interface,
   a storing means which is responsive to a received call-defining message and by means of which one or more force-controlled calls provided with a second priority level and identification, said second priority level being higher than the first priority level, are defined in the database of the mobile station.

5. A mobile station as claimed in claim 4, the mobile station further comprising a channel directing means responsive to the received force control message for directing the mobile station to the call on the second priority level higher than the first priority level.

6. A mobile communication system comprising
   mobile stations that contain a database in which are marked first calls of a first priority level,
   a network infrastructure which said mobile stations communicate with, and
   a call-defining means for producing call-defining messages and for transmitting them to desired mobile stations, and in response to the call-defining messages one or more force-controlled calls having an identification and being on a second priority level higher than the first priority level are defined in the database the mobile station.

7. A mobile communication system as claimed in claim 6, the system comprising a force control means for transmitting force control messages to the mobile stations, and in response to said force control messages the mobile stations are directed to the call on the second priority level higher than the first priority level.

* * * * *